United States Patent [19]

Cavalli

[11] 4,384,842
[45] May 24, 1983

[54] EXTRUSION PLATE FOR FOOD PASTE

[76] Inventor: Alfredo Cavalli, Via Monza 97, 20060 Gessate, Italy

[21] Appl. No.: 243,625

[22] Filed: Mar. 13, 1981

[30] Foreign Application Priority Data

Mar. 14, 1980 [IT] Italy ............................... 21170/80[U]

[51] Int. Cl.³ ............................................... B29F 3/04
[52] U.S. Cl. ................................ 425/463; 264/177 R; 425/376 A; 425/382 R; 426/516
[58] Field of Search ............... 425/464, 461, 467, 465, 425/376 A, 376 R, 382 R, 463; 264/177 F, 177 R; 426/516

[56] References Cited

U.S. PATENT DOCUMENTS

| 1,492,594 | 5/1924 | Dreyfus et al. | 425/461 |
| 1,857,313 | 5/1932 | Maldari | 425/467 |
| 1,946,238 | 2/1934 | Ronzoni | 425/382 R |
| 2,045,421 | 6/1936 | Tanzi | 425/461 |
| 2,049,754 | 8/1936 | Tanzi | 425/461 |
| 2,825,292 | 3/1958 | Benedettelli | 425/382 R |
| 3,008,434 | 11/1961 | Maldari | 425/461 |
| 3,874,837 | 4/1975 | Jamieson | 425/461 |
| 4,015,924 | 4/1977 | LaNieve | 425/461 |
| 4,105,728 | 8/1978 | Lee | 425/461 |
| 4,219,318 | 8/1980 | Cavalli | 425/190 |
| 4,248,577 | 2/1981 | Bory et al. | 425/464 |

FOREIGN PATENT DOCUMENTS 1219110  1/1971  United Kingdom ............ 264/177 F

Primary Examiner—Jeffery R. Thurlow
Attorney, Agent, or Firm—Hubbell, Cohen, Stiefel & Gross

[57] ABSTRACT

An extrusion plate (1) for food paste, such as pasta, has a plurality of extrusion channels (3) each having an inlet section (4) and an outlet section (5) which are each of frustoconical shape having their bases meet to form a constriction (6). The discharge outlet is a larger diameter than the inlet and the cross-section of the channel (3) in the discharge section (5) increases in the direction of discharge of the pasta product so as to vary as a function of the stress associated with the pasta during its passage through the discharge section.

5 Claims, 3 Drawing Figures

EXTRUSION PLATE FOR FOOD PASTE

TECHNICAL FIELD

The present invention relates to an extrusion plate of improved type for the production of different shapes of fresh food paste, the shaping and arrangement of the parts of which provide useful characteristic features on same.

BACKGROUND ART

The conventional extrusion plates for the production of noodles, spaghetti or other similar types of pasta, are formed of a thick plate of strong material in which there are formed extrusion channels of a profile and dimensions equal to those which it is desired to obtain in the cross section of the finished product. Said plate is then provided with a suitable rim which permits the attachment thereof by a threaded ring to any commercial machine for industrial or household use intended for extruding the pasta, such as disclosed in my prior U.S. Pat. No. 4,219,318.

In particular, the extrusion channels of such traditional extrusion plates are of constant cross section and for this reason substantial forces are produced on the material of the extrusion plate. This is due, in particular, to the fact that the movement of the paste within the extrusion channels, and therfore its intrinsic state of stress, is not accompanied by a corresponding variation in the section of these channels which adapts itself, point by point, to the pressure generated in the paste during the course of the extrusion.

The traditional extrusion plates are, therefore, customarily made of metal or of plastic, but in the latter case the thickness of the finished product must compensate for the limitations in the strength of the material used for the production of these extrusion plates.

These disadvantages of the prior art are overcome by the present invention.

DISCLOSURE OF THE INVENTION

The present invention provides an extrusion plate of improved type for the preparation of the various shapes of fresh food paste, which can be combined with a corresponding extrusion unit by a threaded ring and which permits the extrusion of noodles, spaghetti or other similar forms of pasta without producing excessive, uncontrolled forces on the material of the extrusion plate itself. Accordingly the extrusion plate of the present invention can be made of a less resistant material and in lesser thicknesses than the prior art. The resultant product will therefore be less expensive than the traditional ones, both because it is possible to make the extrusion plates of low-cost materials and because the amount of material used is less than in the conventional products. These and other purposes are achieved by the food paste extrusion plate of the present invention by providing extrusion channels in the extrusion plate whose cross section along the longitudinal axis along which the paste is extruded varies as a function of the state of stress of the paste within the discharge section of the channel, with a constriction being provided between the inlet and discharge or outlet section.

BRIEF DESCRIPTION OF THE DRAWINGS

The extrusion plate of the invention will now be described with reference to the accompanying drawings which illustrate one illustrative embodiment of the extrusion plate for use in the production of wide noodles when the plate is used in conjunction with a pasta machine such as disclosed in U.S. Pat. No. 4,219,318, the contents of which is incorporated by reference in its entirety.

In the drawings.

BEST MODE FOR CARRYING OUT THE INVENTION

Figure 1:
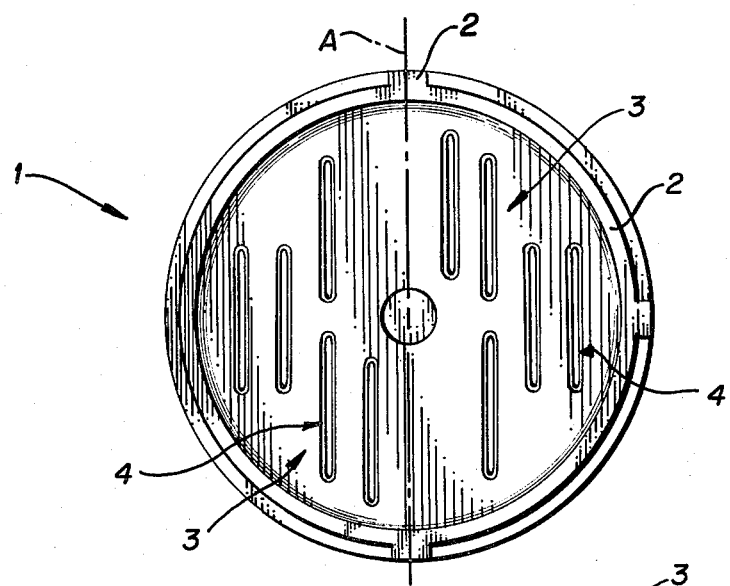
FIG. 1 shows the extrusion plate of the invention in rear view.
Figure 2:
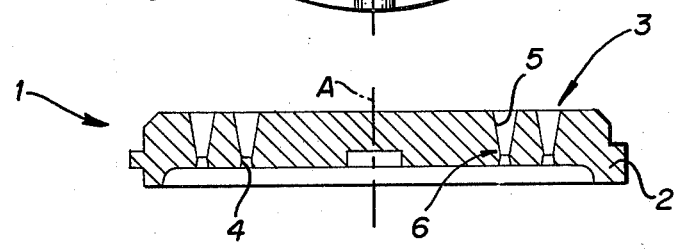
FIG. 2 shows the extrusion plate of FIG. 1 taken along the line A—A.
Figure 3:
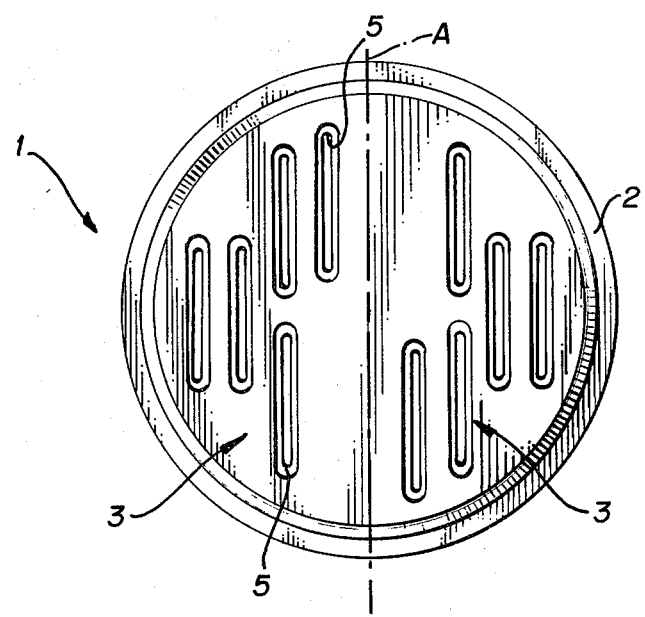
FIG. 3 shows the extrusion plate of FIG. 1 in front view.

Referring now to FIGS. 1-3, the extrusion plate of the present invention, generally referred to by reference numeral 1, is preferably composed of a disk-shaped body 1 provided with radial and peripheral ribs 2 which permit the application thereof to a conventional machine for the extruding of pasta, such as disclosed in U.S. Pat. No. 4,219,318, either for household use or for industrial use.

Preferably the body 1 of the extrusion plate 1 includes a plurality of extrusion channels 3 which each have pasta inlet and outlet sections 4 and 5, respectively, illustrated in the cross-sectional view of FIG. 2. As shown and preferred in FIG. 2, the dimensions, that is the length and width, of the inlet section 4 are smaller than the corresponding dimensions of the outlet section 5. Moreover, these inlet and outlet sections 4 and 5, respectively, are preferably of frustoconical shape in cross-section, with the smaller bases thereof adjoining each other to form a constriction 6. In this way the extrusion channels 3 are of a cross section which increases on the average in the direction of discharge of the pasta product and have the constriction 6 in the vicinity of the entrance or inlet section 4. In this manner, the state of stress of the pasta within the extrusion channels 3 of the extrusion plate 1 is accompanied by a corresponding change in the dimension of the extrusion channels 3 themselves, which are therefore, adapted so as to compensate for these stresses.

The product being worked is therefore not subjected to excessive compression due to the limiting of the losses of head in the channels, which accordingly have no tendency to become clogged or to generate, within them, stresses as high as those which in the conventional extrusion plates justify the use of much stronger materials stamped out from products of great thickness.

What is claimed is:

1. An extrusion plate for the production of different shapes of fresh food paste of the type which can be combined with a corresponding extrusion unit by means of a threaded ring, said extrusion plate having front and rear surfaces and a plurality of extrusion channels connecting said front and rear surfaces, the paste being extruded through said channels from the rear surface to the front surface, each of said plurality of channels having an inlet section adjacent said rear surface and an outlet section contiguous with said inlet section, said outlet section being adjacent said front surface, the cross-section of said inlet section decreasing along said channel away from said rear surface and the cross-section of said outlet section decreasing along said channel away from said front surface, said inlet and outlet sections meeting to form a substantially planar constriction nearer to said rear surface than to said front surface.

2. An extrusion plate according to claim 1 wherein the cross section of an inlet aperture in said inlet section for the entrance of the paste into the extrusion plate is smaller than the discharge outlet of said discharge section.

3. An extrusion plate according to claim 1, wherein each of said inlet sections has a relatively small volume and wherein each of said outlet sections has a relatively large volume.

4. An extrusion plate according to claim 1 wherein each of said extrusion channel inlet and outlet sections comprise a frustoconical configuration.

5. An extrusion plate according to claim 4 wherein the cross section of an inlet aperture in said inlet section for the entrance of the paste into the extrusion plate is smaller than the discharge outlet of said discharge section.

* * * * *